United States Patent [19]

Azure, Jr.

[11] 3,715,568

[45] Feb. 6, 1973

[54] SYSTEM FOR GATHERING AND TRANSMITTING SOURCE DATA

[75] Inventor: Leo L. Azure, Jr., Richland, Wash.

[73] Assignee: Automata Corporation, Richland, Wash.

[22] Filed: Nov. 16, 1970

[21] Appl. No.: 89,993

[52] U.S. Cl..235/61.7 R, 235/61.12 R, 235/61.11 E, 235/61.6 E

[51] Int. Cl. ................................................ G06k 5/00

[58] Field of Search .........235/61.7, 61.7 A, 61.12 R, 235/61.11 E, 61.6 E; 340/149, 149 A, 146.3 AG, 259; 178/23 A, 24; 250/219 D, 219 FR

[56] References Cited

UNITED STATES PATENTS

| | | | |
|---|---|---|---|
| 3,162,468 | 12/1964 | Jonker | 235/61.12 R |
| 3,267,258 | 8/1966 | Bene | 235/61.7 R |
| 3,284,929 | 11/1966 | Azure, Jr. | 235/61.12 R |
| 3,582,627 | 6/1971 | Phelan | 235/61.7 R |
| 3,596,062 | 7/1971 | Street et al. | 235/61.11 E |
| 3,430,033 | 2/1969 | Reed | 235/61.11 E |

*Primary Examiner*—Thomas A. Robinson
*Attorney*—Irons, Sears, Staas, Halsey and Santorelli

[57] ABSTRACT

A data gathering and transmitting system includes apparatus for reading data encoded on elongated strips, such as conventional fan-fold strips, and functions in an edit operation for error checking of the read data and compilation of plural such strips, and in a transmit operation for transmitting the data to a central processing station. The fan-fold strip is conformed to a computer memory print out for convenience of marking thereof as in a quantity ordering application. Plural separate fan-fold strips may be spliced together, the reader automatically affording the splicing operation in the edit operation. The reader also effects error checking, including detection of marks of questionable integrity on the fan-fold strip as to reliability of reading as well as to improper marking, either in the omission of required marks, or in the provision of marks not permitted in the encoding format employed, and automatically positions the strip to identify the position thereon at which the error is detected, for human scrutiny and correction. During edit, therefore, the data is compiled and any error automatically identified for scrutiny and correction by the human operator; in the transmit operation, therefore, reliable and accurate transmission is assured. In an order mode, a receiver at the central station responds to the content and format of the data as received from the transmitter to afford an effective doubling of the content of the transmitted data for a given bit rate of transmission. Herein, the sequence of receipt of data words from each strip identifies the word and the related position of the central computer memory to which each such word relates. A change in the format automatically causes the system to switch to a cash mode in which the system functions to transmit and receive digital words of the prescribed format in accordance with the page identification and other encoded identification thereof, as required.

32 Claims, 12 Drawing Figures

INVENTOR
LEO L. AZURE, JR.

BY Lyons, Sears, Staas, Halsey & Santorelli
ATTORNEYS

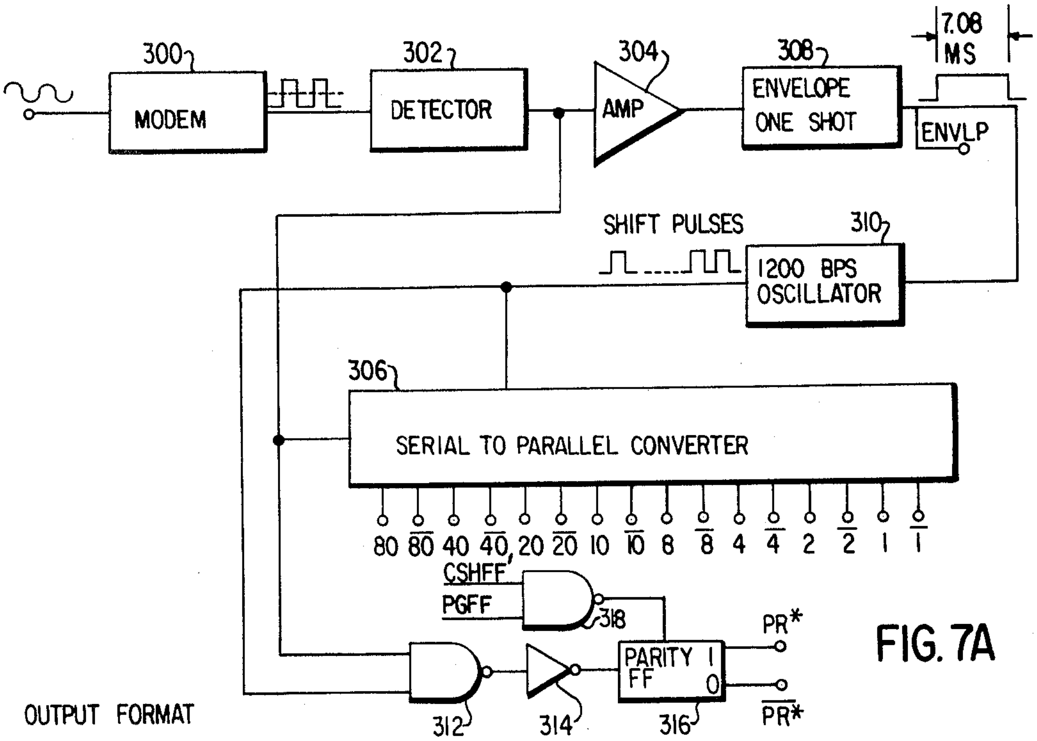
FIG. 7A
| CONTROL 10'S | | | | CONTROL 1'S | | | | DATA 10'S | | | | DATA 1'S | | | | |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 1 | LINE 00 QUANT 01 |
| 0 | 1 | 0 | 0 | 1 | 0 | 0 | 1 | 1 | 0 | 0 | 1 | 1 | 0 | 0 | 1 | LINE 49 QUANT 99 |
| 1 | 1 | 1 | 1 | 1 | 1 | 0 | 0 | | | | | | | | | CASH |
| 1 | 1 | 1 | 1 | 1 | 1 | 0 | 1 | 1 | 1 | $P_{CK}$ | $P_{CK}$ | 1 | 1 | 1 | $P_R$ | PARITY CHECK ($P_{CK}$=1, PARITY GOOD) |
| 1 | 1 | 1 | 1 | 1 | 1 | 1 | 0 | | | | | | | | | PAGE A |
| 1 | 1 | 1 | 1 | 1 | 1 | 1 | 1 | | | | | | | | | PAGE B |
| 1 | 1 | 1 | 0 | 1 | 1 | 1 | 0 | 0 | 0 | 0 | 0 | 1 | 1 | 1 | 1 | START OF MESSAGE |
| 1 | 1 | 1 | 0 | 1 | 1 | 1 | 1 | 0 | 0 | 0 | 0 | 1 | 1 | 1 | 1 | |
| 1 | 1 | 0 | 1 | 1 | 1 | 1 | 0 | 1 | 1 | 1 | 1 | 0 | 0 | 0 | 0 | END OF MESSAGE |
| 1 | 1 | 0 | 1 | 1 | 1 | 1 | 1 | 1 | 1 | 1 | 1 | 0 | 0 | 0 | 0 | |
FIG. 7C
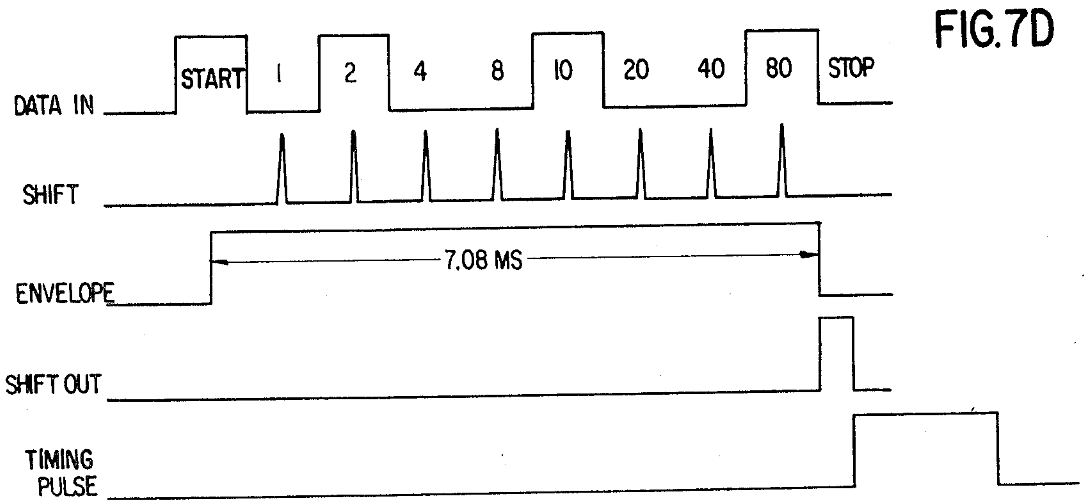
FIG. 7D

SYSTEM FOR GATHERING AND TRANSMITTING SOURCE DATA

BACKGROUND OF THE INVENTION

1. Field of the Invention

This invention relates to a data transmission system and, more particularly, to such a system for reading data from a source document for conversion to a form for transmission to a central receiving system.

2. State of the Prior Art

A highly developed state of the art exists in relation to data transmission systems as well as in document reading apparatus and signal processing apparatus for converting data from source documents to a form for transmission. Such transmission may be to a local electronic data processing system or may be over communication links such as telephone lines to a remote central station for storage and/or further processing.

A specific application of such systems involves stock ordering of desired quantities of merchandise from a master inventory list of available such items. Heretofore, such ordering has typically required a manual entry of data or tabulation thereof in some suitable form and either mailing or verbally communicating the third order to the central warehouse from which the merchandise is then distributed. Such systems are, of course, highly inefficient and/or are subject to error in transmission by oral communication.

Recently, numerous efforts have been made to automate the process, both as to ordering and as to transmission of the order for billing from a central storehouse. One such system requires a keyboard entry device wherein data is entered from the keyboard onto magnetic tape for later transmission. This and other such systems, in addition to being expensive and complex, fail to provide adequate safeguards for detecting of errors prior to the transmission.

More significantly, the more recent such systems, as well as the older completely manual ordering systems are undesirable from the standpoint of efficient use of personnel in completing the ordering process and enabling the subsequent compilation of the data for accurate and rapid transmission to a central station such as a warehouse from which the desired merchandise is distributed. Further, the automated and semiautomated ordering systems heretofore available, in addition to being inadequate from the standpoint of error checking, do not permit of use sporadically and independently by several different personnel to order, but rather can be utilized only by a single member of the staff. Thus, whereas inventory-type functions of clerical staffs could permit of efficient use of their time during slack times, prior art systems fail to be adaptable to that end. Further, such systems are frequently unduly complex in use and expensive.

SUMMARY OF THE INVENTION

The present invention overcomes these and other inadequacies and difficulties of prior art systems. Particularly, the present invention provides for simplified and highly efficient gathering of source data, with subsequent compilation thereof and various error checking functions, for subsequent transmission to a receiver at a central station. Additional error checking functions on the received data are performed at the central and the received data is processed for presentation in a form compatible for further processing by apparatus, such as a computer system, at the central station. Whereas the system of the invention is ideally suited for use as a source data input device and particularly in relation to inventory ordering systems, and therefore is disclosed in that specific application, the data gathering and compilation capabilities of the system in addition to the processing and transmission functions thereof render it of broad applicability for use as a data collection and transmission system in general.

With regard to its use in inventory ordering and as specifically disclosed herein, a fan-fold strip of a prescribed format is received in a special binder also receiving a computer print out of inventory items such that positions of the strip are aligned with corresponding lines of print out of the inventory, or catalog, items of the computer print out. By this technique, positions in the fan-fold strip are made to correspond to positions in memory of a central computer and thus to particular items of an inventory, for example.

Each such strip, as is conventional, comprises a number of pages which are secured together end to end for folding in a fan-like configuration for compact storage and convenience of continuous reading. In accordance with the invention, however, a number of different packages of such fan-fold strips may be utilized by various different personnel, each having one or more such packages with the corresponding inventory print out and positioned in the noted relationship in a binder. Each such package, when completed in a manner to be described, and as later detailed, is then spliced together in the proper sequence for subsequent reading of the data presented thereon and transmission.

Each page of the fan-fold strip includes a marking area to identify the corresponding page of the computer print out with which it is used, and a data entry section typically comprising a number of lines, such as 50, and which may correspond to 50 items similarly presented on the computer print out in alignment therewith, with marking positions in each such line to identify the number of items desired, i.e., the quantity ordered, for each such item. Preferably, the marking is performed by pencil in prescribed mark indication areas, and the areas are presented in accordance with a binary coded decimal format.

In reading of the fan-fold strips, one or more packages thereof are arranged in proper numerical order — although this is not essential since each page is appropriately identified, as noted.

The reading and transmitting apparatus is operable in an edit operation during which error checking is performed, both as to the quality or integrity of the mark indicia, i.e., whether a given mark is sufficiently distinct as to be acceptable and reliable for reading, and as to the presence of format errors in the data presented, i.e., wherein the mark indicia are inconsistent with, or do not conform to, any possible correct presentation of data or wherein marks are missing in positions wherein some data is required to be present.

The error checking as relates to the integrity of the mark indicia comprehends a marking and scanning system, such as for pencil mark indicia which are read by optical scanning, wherein certain of those marks may be unreliable. This may result from too light a mark, incomplete erasures, and the like. Particularly, the reader defines three zones of output signal levels during the edit operation, the first zone being from essentially a zero signal input level to a minimum threshold level, below which any signal is ignored essentially as relating to noise or background signal levels. A third zone is defined as exceeding a second, higher threshold level and wherein any mark producing a signal level exceeding that second threshold is acceptable as an accurate mark and thus reliable data. The second zone then is the zone intermediate the two threshold levels and any signal received within that zone is thus defined as of doubtful integrity requiring human scrutiny to resolve the ambiguity. Typically, the second band is approximately centered about a level which constitutes the operational threshold, as a single threshold level, during the transmission cycle. The operator, during the edit operation, then corrects any such questionable marks as result such that in the subsequent transmission operation, every mark will clearly be well above or well below the operational threshold.

A further error checking comprises the recognition of mark indicia presenting forbidden or rejected bit encoding with regard to the data encoding format adopted and as to which specific examples are hereinafter given, as well as to the total absence of mark indicia when at least one or more indicia should be present. For example, a clerk may have forgotten to complete a listing or the like.

During edit, whenever any of these errors arises, the strip is automatically stopped and reversed in its direction of transport and then stopped, to position the line of questionable data adjacent a pointer, and suitable alarm means are actuated to call the attention of the operator to that thus identified position of the strip which has not satisfied the error checking function. Each packet of strips of a continuous length is thus processed during the edit operation until the end of the strip occurs and the strip again stops, permitting the operator to splice on the next packet.

The data format of the fan-fold strip includes a mark for each page thereof which is detected to identify the beginning of a new page and to provide a parity check control word (PCCW) in accordance therewith, the parity check being established in accordance with the data of the preceding page of the strip and affording a parity check at the receiver for that page. Data is read from each line of the strip in parallel and converted to serial form for processing by a modem and transmission thereof to a receiver.

At the receiver, a modem converts the transmitted signal to digital form and digital processing circuits then convert the serial word to a parallel word for further processing. Logic circuits identify receipt of the parity check control word and thus identify the end of any preceding page of any transmitted data and the start of a new page. Registers included in the receiver respond to the received data and are initialized upon receipt of the PCCW for receipt of predetermined succeeding words of data to be recognized as page identification and then to proceed to receive and process subsequent words as data.

The transmitting operation, as a data transfer function, is effective either in an order mode or in a cash mode. As will be described, in the order mode, the rate of data transmission is effectively double that of prior art systems and of that in the cash mode, for a given bit rate of transmission. The system automatically selects the order mode or the cash mode in accordance with the provision of one or two page marks and the resultant generation of one or two PCCW's, respectively.

In the order mode, and following the page number identification word or words, the receiver then counts the the data words thereby affording automatic indexing with respect to that identified page as to the items presented. Accordingly, the receiver automatically produces a control word identifying the data word based on the number of that data word in the sequence as received for the plurality of such words for each identified page. By this technique, and without exceeding the maximum recommended rate of 1,200 bits per second over conventional telephone line circuitry utilized for data transmission, the subject system provides in the order mode a receiver output of 400 characters per second. By contrast, conventional systems utilizing a straight BCD numeric permit only 200 characters per second transmission and transmission with the ASCII code (American Standard Code for Information Interchange) would provide a maximum of only 120 characters per second.

In the cash mode, however, the line numbers are not counted since the data to be transmitted typically will not conform to a structured addressing mode for a memory as in the order function and on the basis of which the doubling of the information content is achieved in the order mode. It will, of course, be apparent that any system of data to be transmitted and which has the characteristics of the described inventory order mode may be performed in accordance with the subject order mode whereby the effective doubling of the rate of information transfer may be realized.

Accordingly, the system of the invention provides a simple yet highly effective and efficient technique for inventory and similar ordering operations and provides automatic indexing of a central computer memory in accordance with the alignment of the fan-fold order strip and a computer print out inventory listing. The source data input apparatus of the invention provides for rapid and accurate error checking in addition to compilation of plural packs of fan-fold strips to assure uninterrupted and high speed reading of the strips, as compiled, in a transmit operation. During transmission, and particularly in the order mode, highly efficient utilization of telephone line time is achieved by the effective doubling of the information content of transmitted data while operating within the recommended maximum data bit transmission rate. In both the order mode and cash mode, the system is highly efficient and accurate, providing for the transmission of source data to a central processing site.

BRIEF DESCRIPTION OF THE DRAWINGS

FIGS. 7A and 7B comprise a logic diagram, partly in block diagram form, of a receiver for use at a central station for receiving data transmitted from a data input and transmitting device in accordance with the invention;

FIG. 7C is a data output format chart illustrating the output data produced by the receiver of FIGS. 7A and 7B; and FIG. 7D is a waveform chart illustrating certain control and timing functions in the receiver of FIGS. 7A and 7B.

DETAILED DESCRIPTION OF THE INVENTION

Figures 1, 2:
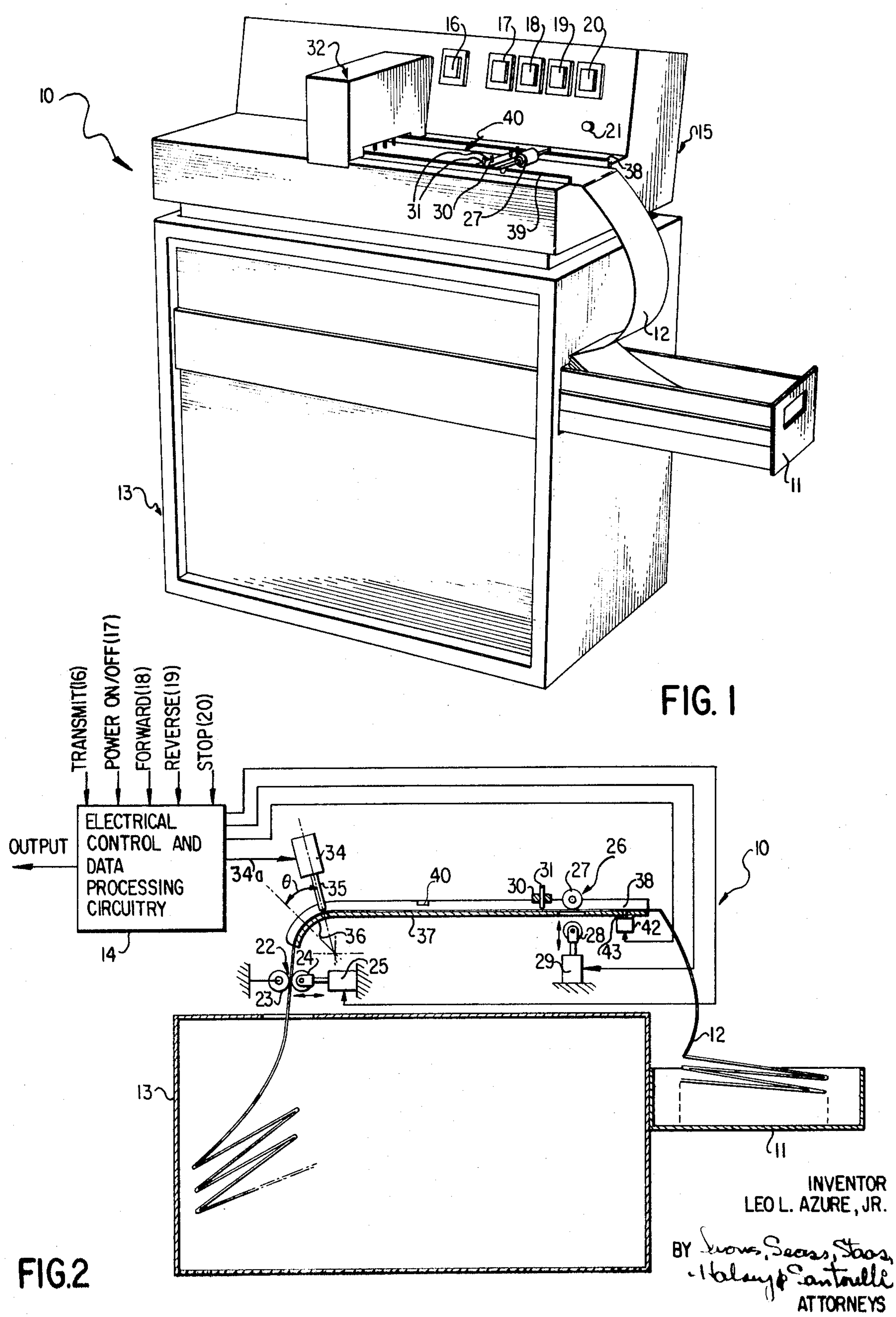
FIG. 1 comprises a perspective view of an input device for reading a source document in accordance with the invention.
FIG. 2 comprises a cross-sectional view in diagrammatic form of the electronic control and mechanical transport elements of the device shown in FIG. 1.

In FIG. 1 is shown a perspective view of the source document reader and transmitting unit and in FIG. 2 is shown, in schematic and block diagram form, that same unit for purposes of illustrating the transport of the document bearing the source data. Reference will be had simultaneously to FIGS. 1 and 2 in the following discussion.

The reader and transmitting unit is generally designated by the numeral 10 and includes a hopper 11 for storing a supply of a document 12 comprising a fan-fold strip to be transported through the read mechanism for optical scanning, the scanned and read document being received in a bin 13 in a random stacked fashion. The electric control and data processing circuitry shown in the block 14 in FIG. 2 is preferably disposed within an upper portion 15 of the apparatus as shown in FIG. 1. A number of control buttons accessible for operation by the operator are provided in the upper portion 15 and are labelled 16 through 20, identified more completely in FIG. 2 as providing the control functions of commanding the system to transmit as to the button 16, power on/off control as to the button 17, forward document transport control as to the button 18, reverse document transport control as to the button 19, and a stop control as to the button 20, the latter stopping the tape transport without turning off the main power source and thus merely placing the system in a standby condition.

The means for effecting forward and reverse transport of the tape may be conventional and are illustratively shown in FIG. 2. More particularly, the forward drive unit 22 is provided by a pinch roller 23 and a drive roller 24 which is actuated to engage the roller 23 by a solenoid 25, the latter being selectively energized by the circuitry 14 in accordance with actuation of the forward control button 18. The reverse transport control 26 is afforded by a pinch roller 27 and a driven roller 28 schematically shown to be actuated by solenoid 29 for engaging the roller 27. A gravity weighted tensioning device 30 includes a plurality of friction weights 31 which are free to reciprocate within the main support of the device 30 to engage the strip 12 and thus apply drag thereto. This assures proper transport operation by either of the transport means 22 and 26. The tensioning means 30 with the weights 31 and the pinch roller 27 for the reverse transport means 26 are also illustrated in FIG. 1.

In the disclosed embodiment of the invention, the strip 12 bears data provided thereon in the form of pencil marks received in accordance with an appropriate format of mark indication areas on the strip to be detected by optical scanning means in the system 10. The scanning means is contained within housing 32 in FIG. 1 and is shown in FIG. 2 to include a head 34 including a fiber optics probe system 35. The probe 35 scans the strip 12 as it passes over an arcuate segment 36 of a support plate generally identified as 37. The arcuate segment preferably is of about 3 inches radius and thus $r \approx 3$ inches. This technique causes the strip 12 to be tensioned and thus effectively increases the stability thereof as it passes through the scanning region, reducing flutter and other like effects obtaining in high speed transport. This relatively simple technique of transporting the document over this radius greatly enhances the accuracy and thus reliability of the scanning operation. It will be appreciated that the tensioning device 30 cooperates with the forward drive mechanism 22 to maintain the strip 12 in a taut position with respect to the arcuate guide 36. The support plate 37 furthermore includes edge guides 38, only one of which is shown in FIG. 2, to maintain lateral alignment of the strip 12 through the scanning area. The guide 38 as well as the companion edge guide 39 is also shown in FIG. 1.

Preferably, the optical probe 35 is offset from the normal to the tangent at the position on the arcuate surface 36 to which the probe 35 is directed, at an angle $\theta$. The angle $\theta$ is selected to equal the angle of transmission and thus also the angle of acceptance of the fibers of the probe. This angle substantially eliminates any light directly reflected from the surface of the strip 12 from being received by the accepting fibers of the probe; instead only diffusely reflected light is transmitted back to suitable optical-electrical transducers, such as photodiodes, associated therewith. This offsetting technique affords a 3:1 increase in the signal-to-noise ratio, as contrasted to the ratio which may be realized when the axis of the probe is aligned with the normal to the scanned surface, when scanning reflective marks, such as pencil marks. The improvement results from the fact that pencil marks frequently will be more reflective, despite being black, than the contrasting light background against which they are to be detected and sensed. More complete details of this technique and a theoretical explanation of the improved performance which results is afforded in the copending application of Leo L. Azure, Jr., entitled "Optimum Positioning of Fiber Optics Probe for Improved Signal to Noise Ration," Ser. No. 78,840, filed Oct. 7, 1970, and assigned to the assignee of the present invention. Of course, if not desired, or if The non-reflective mark indicia are employed as well as in the case where punched strips would be employed and the like, conventional positioning of a fiber optics scan system may be employed.

As more fully detailed hereafter, the scan head 34 and the probe 35 includes a plurality of channels corresponding to a plurality of columns of mark indication areas of the strip 12. These plural channels each include an optical-electrical transducer, such as a photodiode; the plurality of electrical outputs therefrom are generally indicated by the lead 34*a* supplying these signals to the circuitry 14.

Figures 3, 4, 5:
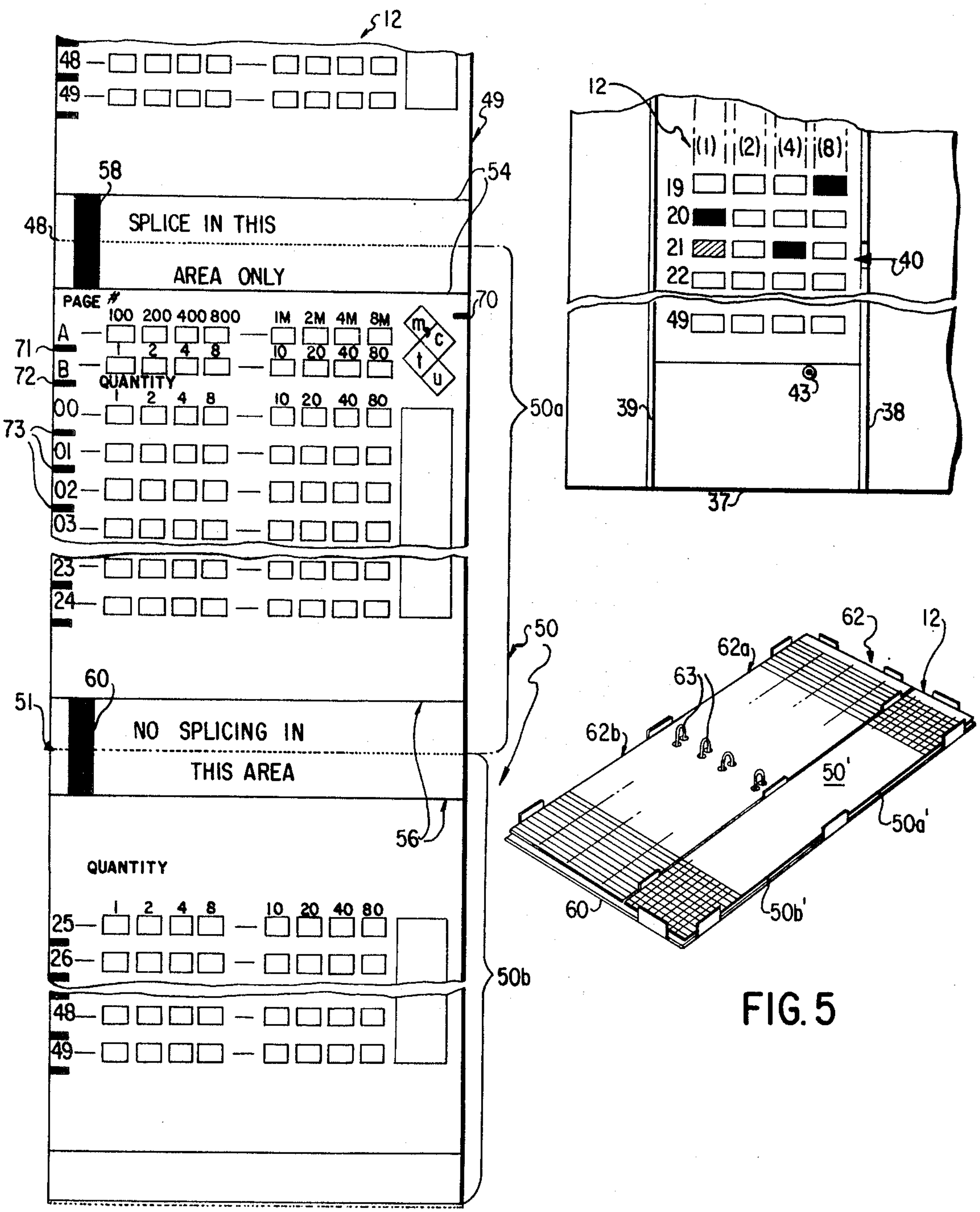
FIG. 3 is an enlarged view of a portion of the transport mechanism in the device of FIGS. 1 and 2, illustrating a feature of the automatic control of that device.
FIG. 4 is a detailed view of a source document comprising a fan-fold strip of the type utilized in the system of the invention and corresponding to the strip as illustrated in the foregoing figures.
FIG. 5 is a perspective view of a binder for receiving a computer print out page and a fan-fold strip open to expose a full page thereof for positioning in alignment with a corresponding opened page of the computer print out in accordance with a feature of the invention.

In FIG. 3 is shown a top view of only a portion of the support surface 37 and associated edge guides 38 and 39, with a section of the strip 12 contained therein sufficient to indicate a feature of the invention not readily illustrated in either of FIG. 1 or FIG. 2. Particularly, at some convenient position, preferably intermediate the reverse transport drive 26 and the scan head 34, an indicator 40 is mounted, and which may extend through the guide 38 for example. The strip 12 in FIG. 3 is shown to have a format of mark indication areas sufficient only for explaining the present feature; a more detailed description of the format is afforded in FIG. 4, to be discussed.

In FIG. 3, the strip 12 includes a plurality of rows each of plural mark indication areas arranged in corresponding columns; specifically shown in FIG. 3 are rows 19 through 22 and 49, the columns of the plural mark indication areas in each row being labelled 1, 2, 4, and 8. As to the rows 19 and 20, a heavy dark pencil mark is illustrated in the positions 8 and 1, respectively. In row 21, however, a lightly colored mark appears in position 1, indicated by cross-hatching of that indication area. This is illustrative of either a poorly erased previous mark or a mark which has not been made with sufficient density to afford reliable reading. Note that, since more than one position may have a mark, there has also been illustrated a heavy mark in position 4 for row 21.

In operation, when a mark of questionable integrity is encountered such as that in position 1 for row 21, the strip 12 is stopped in its forward transport and then reversed and again stopped such that the row containing the questionable mark is positioned opposite the pointer 40. If desired, a suitable alarm may also be provided as illustrated by lamp 21 in the upper portion 15 of the system shown in FIG. 1. Audible alarm means may be provided in addition or in the alternative, to alert the operator of the detection of a questionable mark.

As more fully described hereafter, the strip 12 is also stopped in the aligned position with indicator 40 upon the detection by the system of other errors, including the omission of marks where marks must be provided in accordance with the data format of the system, as well as the presence of marks in positions rendering those marks unacceptable or inconsistent with the data format.

Referring concurrently to FIGS. 2 and 3, there is further provided a micro-switch 42 having a sensing arm 43 which extends through the support 37 to be depressed by the strip 12 when received thereover. When the trailing edge of the strip 12, as illustrated at 12*a* in FIG. 3, passes over the sensing arm 43 of the micro-switch 42, the arm is free to project upwardly and does so, thus detecting the end of the strip. Since the system of the invention intends that plural packs of fan-fold strips will be employed by a corresponding number of different employees, this automatic stopping function is convenient to permit termination of tape transport substantially immediately following detection of the trailing edge. The trailing edge 12*a* is thus left in a convenient position for splicing the leading edge of a next packed of fan-fold strips thereto and conveniently by conventional adhesive tape. If the sensed trailing edge is indeed the end of the strip, the forward control button 18 may be actuated to override the automatic stop function and complete sensing of the strip.

As will become clear in the functional description which follows, the system is initially operable in an edit operation to both check for the errors with automatic positioning of the strip to indicate the row of questionable mark indicia or in which erroneous marks appear or marks are absent, and also to permit the splicing operation. During transmit, it is assumed that the errors have been corrected and the entirety of the packs of strips have been spliced together to permit a continuous feed-through of the entire strip. The stop button 20, however, affords an override even in the transmit operation as a safety measure but is more typically used in the edit operation for convenience, as desired.

In FIG. 4 is shown a section of the strip 12 comprising the data source document as discussed in the preceding figures. It is to be understood that the system of the invention is adaptable for use with various types of source documents; however, its primary advantages are realized with the use of a source document of great length which is conventionally folded in accordion pleat-type fashion and known as a fan-fold strip. In the disclosed system, the strip comprises a plurality of segments termed pages, one of which is shown from beginning to end thereof, with certain intermediate portions eliminated for ease of illustration, at 50 in FIG. 4, the trailing edge portion of a preceding such page being shown at 49. The page 50 furthermore includes a first section 50*a* and a second section 50*b* joined at a fold line 51 extending transversely of the strip. The line 51 frequently is perforated to facilitate the folding. In a similar manner, the adjacent, or successive, pages are joined at their corresponding trailing and leading edges by a fold line as illustrated at 48 with respect to the pages 49 and 50. The leading edge of a page comprises the leading edge of the strip 12 and thus some selected page 50 will define the leading edge of the strip 12 such as where a preceding page 49 has been severed therefrom along the fold line 48. Correspondingly, these may define the trailing and leading edges of two packets to be spliced and thus in the transverse region defined by the lines 54 there appears the notation "SPLICE IN THIS AREA ONLY." Correspondingly, within the region defined by the lines 56 above and below the fold line 51 of page 50 there appears the notation "NO SPLICING IN THIS AREA." As will be appreciated, the leading edge of the strip 12 is to initiate with the leading edge of a given page and not midway thereof. In each of these areas defined by the lines 54 and 56 there appears an elongated mark 58 and 60, respectively, extending the longitudinal height of the spacing of the lines. These marks are detected and disable reading functions of the electrical system thereby to assure that no extraneous marks are sensed as data. That inhibit function thus prevents errors from being introduced.

The specific format of the mark indication areas of the strip 12 will be more fully appreciated with concurrent reference to FIG. 5 wherein is shown a fan-fold strip 12 opened to a specific page 50 as received in a holder 60, the latter also receiving therein an inventory sheet 62 including portions 62*a* and 62*b* corresponding to the portions 50*a'* and 50*b'*, respectively, of the page 50'. For convenience, suitable ring binders 63 secure the large sheets 62 in position intermediate of the lengths thereof and such that the sheets may be turned from the bottom simultaneously with turning of the fan-fold strip 12 to present new corresponding sheets 62 and pages 50' of the strip 12.

The sheets 62 comprise a print out such as of a computer memory. The alignment of the fan-fold strip 12 with the sheets 62, likewise a fan-fold strip but of larger dimensions in width, thus enables direct correlation of the lines of the computer print out and the lines of the mark indication areas of the fan-fold strip.

As noted, the sheets 62 comprise a master catalog of all items in a store and thus of the inventory available from a central source. The catalog is actually a computer print out of items, in sequence, as they are stored in a computer memory. Each item in the catalog conveniently is identified by a page number and a line number. With reference to the strip 12, in FIG. 4, there correspondingly are provided mark indication areas for entry of the page number of the catalog with which the page 50 of the strip 12 is to be utilized. Particularly, two lines labelled A and B are provided for entry of the page number in binary coded decimal fashion for units, 10s, 100s, and 1,000s which typically is adequate for any such catalog, preceded by the notation PAGE # . Following these two lines is the portion of the section 50*a* for entry of data and particularly 25 lines are provided labelled 00 to 24. Further, below the fold line 51 the quantity listing continues for lines 25 to 49. Each of these 50 lines therefore corresponds to 50 lines of the computer print out from the catalog page 62 and permits entry of indicia in binary coded decimal fashion to indicate the desired number of a given item being ordered, each item, of course, being identified by the page number and line number. The number of units of each item is, of course, recognized by the computer and is indicated on the catalog print out. For example, an order of "1" for an item may represent one case of 24 cans of soup, whereas an order of "10" may represent an order of 10 brooms.

Considering the page 50 of FIG. 4 more in detail, following the blanking mark 58, the first mark which is read is identified at 70 and comprises a page mark indicating to the system the beginning of a new page. The next positions read are those of the lines A and B providing, in those two lines, positions for encoding the page number of the catalog in BCD form. Each of these lines is followed by a corresponding timing mark 71 and 72, respectively. In similar fashion each of the quantity lines 00 to 49 is followed by a timing mark. The timing marks in each instance are disposed below the mark indication areas, which for the quantity section are labelled 1, 2, 4, ...80 and permit accurate detection of marks falling anywhere within those areas or the immediate position preceding the leading edge of the timing mark but following the trailing edge of the preceding timing mark. Further, it is understood that the read head in FIG. 2 includes individual or selectively responsible fiber optics sensing probes, for the column of timing marks, the column containing the blanking marks 58 and 60, for each of the columns of BCD encoded positions for the page number and quantity or data order, and for the column containing page mark 70.

As more fully explained hereafter, each PAGE # portion of each page is required to contain mark indicia in lines A and B and the absence of any marks therein, or the presence of incorrect combinations of marks, such as 2 and 8, 4 and 8, 20 and 80, and 40 and 80 will automatically cause the read apparatus to stop and reverse the strip, as before described, to present the line containing a marking error for human scrutiny. Thus, lost pages of data are avoided. the page number error check and other error checks as before noted, including the check of mark integrity, are performed during the edit operation, the latter as well providing for automatic stopping for the splicing operation.

In the edit operation, the strip is advanced at high speed, and is dumped at random into the bin 13. Upon completion of the edit operation, the strip is reversed at slow speed and neatly folded in the hopper 11.

The transmit operation is again performed at the high forward speed. For example, that speed maybe 25 inches per second, affording a forward running speed and thus reading speed of 100 lines per second and thus 100 8-bit BCD words per second. Fan-folding at that operating speed is beyond the current state of the art, particularly in view of the splices. Reliable fan-folding is effected at the slower speed of reverse transport and the strip thus neatly folded in the hopper 11. Following the transmit pass, the strip is again reversed and neatly folded in the hopper 11 for subsequent use and reference if desired.

Figure 6A:
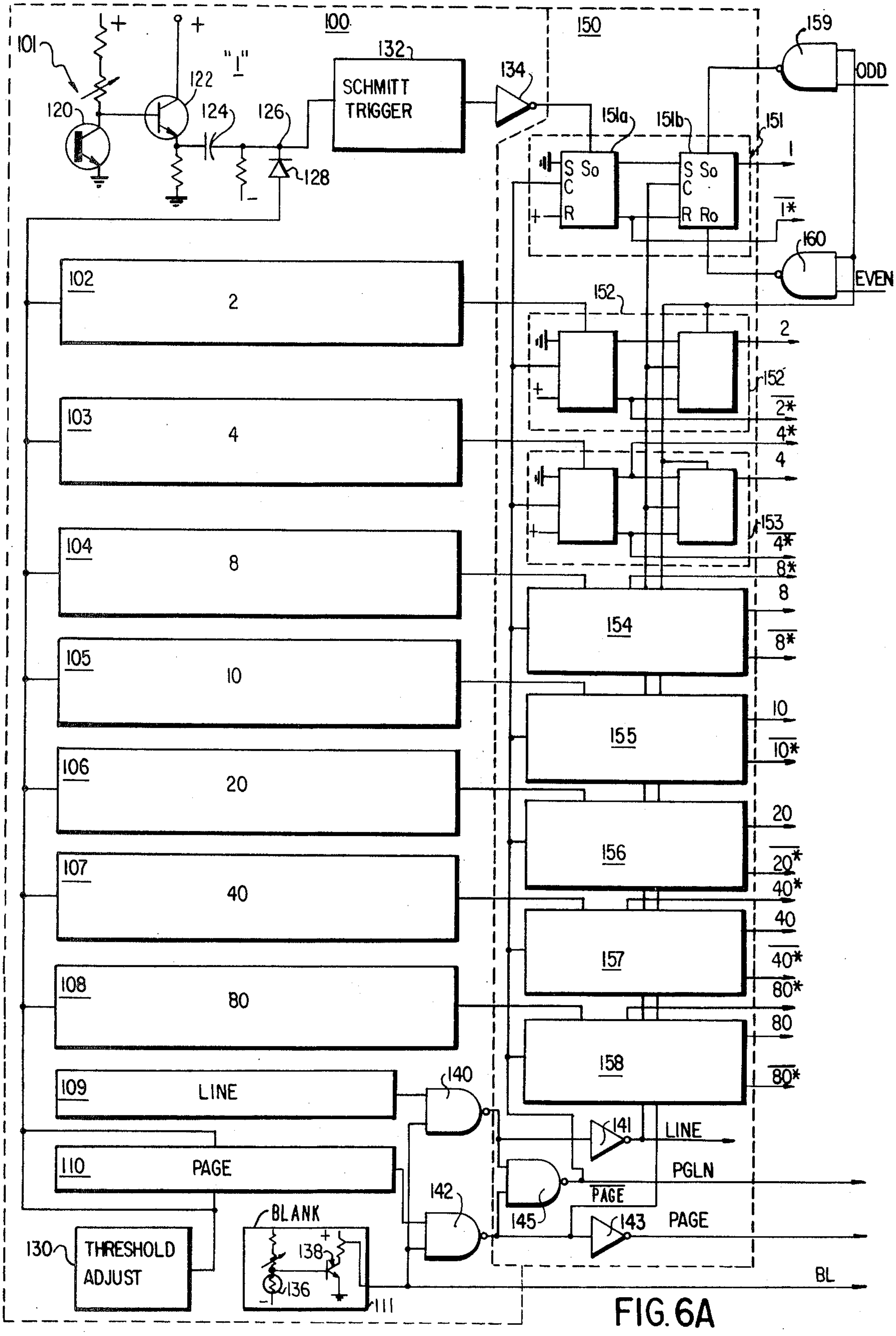
FIGS. 6A through 6C comprise a schematic, partly in block diagram form, of the logic and signal processing circuitry of the data input and transmitting device of the invention as illustrated in the foregoing FIGS. 1 and 2 in accordance with reading and processing of data derived from a source document as illustrated in FIGS. 3 through 5.
Figure 6B:
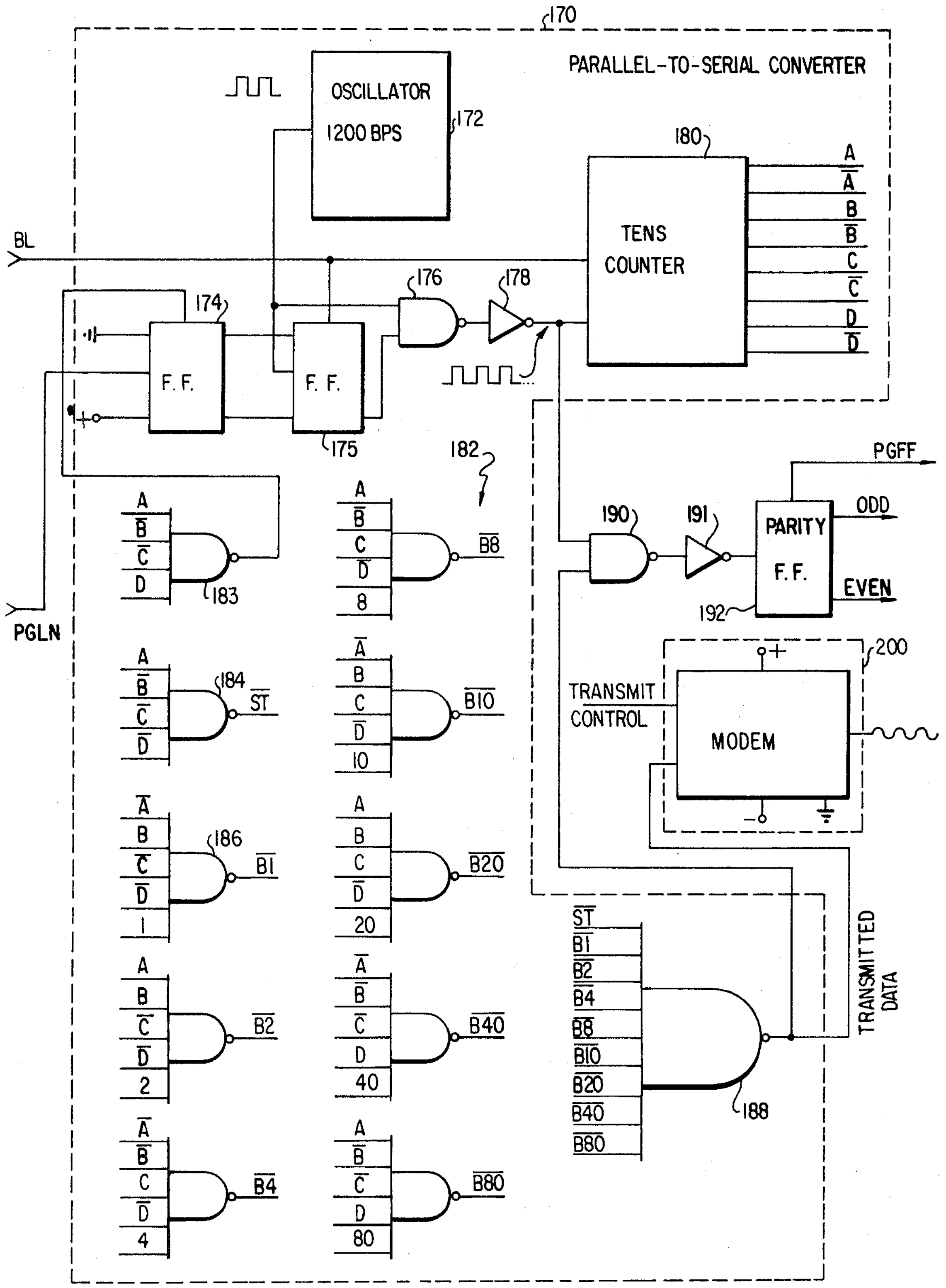
Figure 6C:
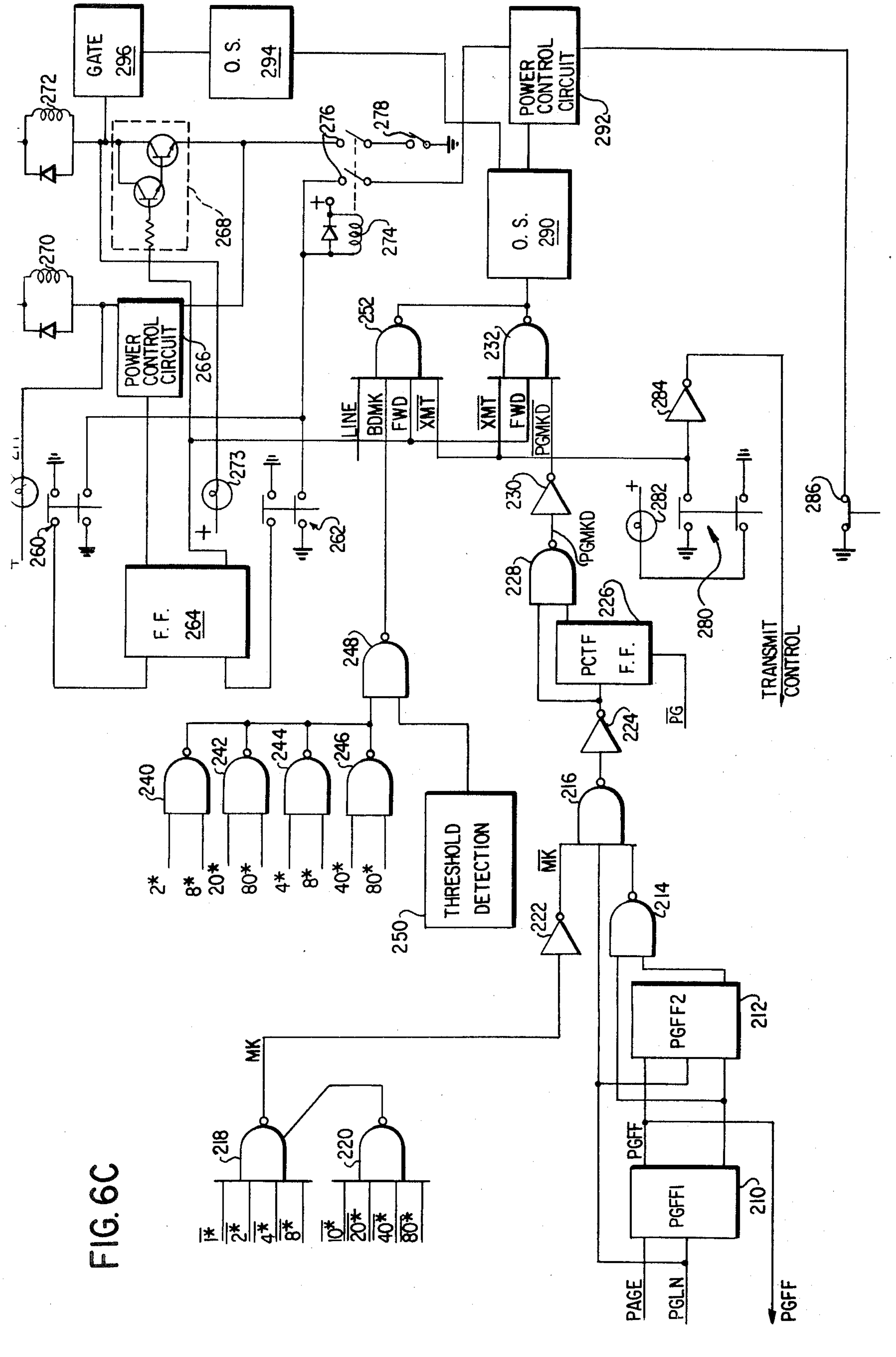

In FIGS. 6A through 6C is shown the logic schematic of the reading and data processing apparatus for effecting transmission of the read data. Although other utilization equipment could receive the output signal from the reading and data processing circuitry, in the disclosed system, that signal is converted from a parallel BCD signal to a serial signal and then to analog form for transmission over voice telephone lines, for example.

From the detailed description of the source document, comprising the fan-fold strip of FIG. 3, it will be recalled that there are utilized eleven columns or channels, including eight data channels and three control channels. As also previously noted, the indicia comprise marks which can be optically detected, although any other suitable mark indicia may be employed with appropriate scanning means. In the disclosed system, however, the marks are dark marks on a light background and are detected by optical scanning system utilizing photodiode detectors. Accordingly, in FIG. 6A is shown a detection circuit 100 including 11 detection channels for the eight data channels and three control channels. The specific channels are identified as 101 through 111, 101 through 108 comprising data channels and which are labelled 1, 2, 4, 8, 10, 20, 40, 80, corresponding to the columns of mark area positions as labelled on the strip. Control channels 109 through 111 are labelled LINE, PAGE, and BLANK, respectively. Each of the channels 101 through 111 is identical and thus only channel 101 is shown in detail.

Phototransistor 120 is connected in a suitable biasing circuit and through an emitter-follower transistor 122 and a coupling capacitor 124 to a junction 126. The junction 126 is connected to the cathode of a diode 128, the voltage level of which is set by threshold adjustment circuit 130. The circuit 130 clamps the cathode of diode 128 to a minimum voltage set thereby.

In operation, the detection circuit references automatically to the lightest background to which the phototransistor 120 is exposed, and the ratio of a dark mark to the referenced light background is sensed. More specifically, the phototransistor 120 initially detects a dark background before a strip enters the scan area. The collector current of phototransistor 120 is then low and the voltage correspondingly high. As a result, the emitter-follower 122 conducts and a relatively large voltage is coupled to the capacitor 124 for charging thereof. When a strip is inserted, the light background causes the collector voltage of phototransistor 120 to go to a low voltage as the detector increases conduction. The result is to produce a negative going voltage from the emitter-follower 122 which is coupled through capacitor 124 to the cathode of diode 128 at junction 126. Since the voltage at the cathode of diode 128 is clamped to a minimum by the threshold adjust circuit 130, the capacitor charges to a voltage which is a differential between the most negative collector voltage of the phototransistor 120 and the clamped voltage at the cathode of diode 128. The differential voltage thus produced across the capacitor is maintained during subsequent positive going pulses, resultant from reading mark indicia, at the output of the phototransistor 120 because of the high RC time constant in that direction for discharge of the capacitor.

The net result of the sensitivity control circuit as described, is that the positive going pulses generated upon detection of dark marks and presented at the junction 126 are referenced to the threshold adjust voltage from circuit 130 and are of a magnitude proportional to the light to dark background experienced by the phototransistor 120. Accordingly, variations in the level of illumination, in temperature, and in characteristics of the strip being sensed such as the background color or reflectivity, as well as various long-term effects such as aging and the like which result in change of the bias voltage of the phototransistor 120, are not seen at the junction 126 and thus do not result in variations in the output voltage pulses obtained in response to reading of marks.

The signal thus produced as junction 126 is applied through a conventional circuit such as a Schmitt trigger 132 which provides a square output pulse, in turn supplied through inverter 134, to produce a negative going pulse from the channel 101 in response to each pencil mark sensed.

The blank channel 111 includes a photosensing device 136 connected in a suitable biasing circuit for supplying an input to transistor amplifier 138 which produces at its collector output terminal the output signal BL.

Photosensor 136, when sensing the blanking marks, renders transistor 138 conductive and clamps the BL output to ground potential. BL thus serves to inhibit processing operations when passing through the folded sections or spliced sections of the strip. Note, for example, that BL is supplied as a second input to NAND gates 140 and 142 respectively receiving the outputs of the line and page channels 109 and 110. Thus, when reading the blanking mark, NAND gates 140 and 142 are disabled and produce the true output conditions $\overline{LINE}$ and $\overline{PAGE}$. The output channel 111 then is up or logic "1" in the absence of reading the blanking, mark. Thus, when the outputs of either the line or page channels 109 and 110 is up, NAND gates 140 and 142 are enabled and produce logic "0" at the outputs thereof. Accordingly, $\overline{LINE}$ and $\overline{PAGE}$ become logic "0" or false and thus LINE and PAGE are true. The complements of the outputs of NAND gates 140 and 142 are derived through inverters 141 and 143, respectively, comprising LINE and PAGE. $\overline{LINE}$ and $\overline{PAGE}$ are also applied to NAND gate 145 which functions as a logic OR to the line and page channel outputs to produce, therefore, when either the line or page mark is sensed, the output PGLN.

A buffer storage 150 receives the outputs from the detection circuits 100 and particularly includes a plurality of two stage or 2 bit shift registers 151 through 158 receiving the outputs of the channels 101 through 108, respectively. Considering the first shift register 151, the two stages or bits are identified as **151*a* and 151*b*. Each may comprise a flip-flop having set S and reset R inputs and corresponding outputs 1 and 0 as illustrated and additionally having a clocking input as shown at C in 151*a*** for reset thereof on the trailing edge of an input pulse, and further set SO and reset R0 inputs for setting and resetting thereof on the leading edge of input pulses. In conventional fashion, the clock input C to the second stage effects transfer of data thereto from the first for setting of the second.

The operation of the buffer will be explained with reference to the first three 2-bit shift registers 151, 152, and 153 which are illustrative of the totality thereof. Accordingly, these are shown in detail whereas the remainder thereof are shown in block diagram form.

The first signal produced in reading a strip is that resultant from sensing of the page mark. This function is enabled following the blanking control of channel 111, as described. As more fully described, the page mark results in generation of a parity check control word which provides both parity check and operates as a control word to identify a page of data being transmitted. As explained more fully hereafter, the parity check control word (hereinafter PCCW) may also be utilized in accordance with generating one or two thereof at the beginning of each page to distinguish automatically between order and cash modes of transmission. Considering first the order mode, the page signal is provided through the PGLN output to the first stage of each of the shift registers to reset them to "0" setting and through the $\overline{PAGE}$ output to the second stage of the registers 152 through 158 to set the latter to "1."

The first channel 151 is utilized for the parity bit and accordingly the $\overline{\text{PAGE}}$ output is applied to one input of an associated pair of NAND gates 159 and 160 which, depending upon the parity bit required, are enabled and correspondingly effect setting or resetting of the second stage 151*b* at the terminals $S_0$ and $R_0$. As a result, the output "1" will be either logic "1" or logic "0" from stage 151b in accordance with the parity bit, whereas the outputs 2, 4, 8, 20, 40, and 80 are all logic "1." This then constitutes the eight bits of the PCCW.

The next signals derived from the strip are the lines A and B of the page number and then the line 00 through line 49 of the data or quantity order in the disclosed embodiment. Each such line comprises 8 bits, detected and processed through the corresponding eight data channels, and applied to the set inputs $S_0$ of the first stages of shift registers 151 through 158. Each such line of data bits is followed by a line mark detected and processed through channel 109. That line mark operates through the PGLN output to reset the first stage and through the LINE output from inverter 141 to transfer the setting of the first stage to the second stage in accordance with enabling that second stage to respond to the outputs of the first stage upon the occurrence of the line mark. By this technique, substantial leeway in the mark positioning is afforded and particularly the mark may occur anywhere in the space between successive line marks and still be accepted and processed.

The first shift register 151 provides the data "1" output from the set output of the second stage 151*b* and the complement $\overline{1}$* from the reset output of the first stage 151*a*, utilized in an error checking function to be described. That latter notation is also indicative of outputs utilized from other shift registers for the same and also other error checking functions. Thus, whereas the outputs "2" and $\overline{2}$* from shift register 152 are similarly derived, shift register 153 provides a further output 4* from the set output of the first stage, as indicated. The outputs of the remaining shift registers are derived from corresponding terminals thereof in accordance with the similarly identified outputs.

The digital words actually transmitted contain ten bits, the eight data bits plus a start and a stop bit. These bits are converted to serial form for transmission by a conventional voice channel data modem over telephone lines at 1,200 bits per second to a receiving modem.

In FIG. 6B is shown a parallel-to-serial converter 170 also containing timing and logic gating functions for the generation of the 10-bit serial word. Also shown is the data modem 200. The converter 170 includes a square wave oscillator 172 generating a clock pulse train at 1,200 bits per second (BPS) and which establishes the timing rate of the transmission of the bits of each word, as converted to serial form. A synchronizer, including flip-flop stages 174 and 175, serves to enable NAND gate 176 to supply through inverter 178 a clock pulse train which is applied to a 10s counter 180. The latter produces the binary coded outputs A, $\overline{A}$, ...$\overline{D}$ for the binary values $2^0$ through $2^3$, as indicated. Logic gating circuitry 182 decodes the binary encoded count outputs of the 10s counter to establish timing functions for the conversion function and thus the transmission of the serial digital word.

More specifically, stage 174 of the synchronizer is set by PGLN. The next occurring clock pulse from oscillator 172, on the trailing edge thereof, resets stage 175, thereby enabling NAND gate 176 to gate through the next and each successive occurring clock pulse. Decoder 183 produces a pulse output on the ninth count which, on the leading edge thereof, resets stage 174. The subsequently occurring, tenth clock pulse then, on its trailing edge, resets the second stage 175. That 10th clock pulse, therefore, is gated through NAND gate 176, thus completing the generation of a 10 pulse train output.

Considering more fully the count decoding function, gate 184 responds to the "1" count of A, $\overline{B}$, $\overline{C}$, $\overline{D}$, to produce the start bit $\overline{\text{ST}}$. Next, and beginning with gate 186, there are generated in serial sequence by the corresponding gates the eight outputs $\overline{\textbf{B1}}$, $\overline{\textbf{B2}}$,...$\overline{\textbf{B80}}$. These gates respectively receive the detecting channel outputs from the second stages of the shift registers. For example, the output of the data "1" channel is applied as a fifth input to NAND gate 186 in conjunction with the counter outputs $\overline{A}$, B, $\overline{C}$, $\overline{D}$. The 8 data bits thus are produced in time sequence and are applied through a logic NAND gate 188 functioning as a logic OR, to produce the data to be transmitted as a serial digital pulse train to the data modem 200. The data modem 200 is enabled by a transmit control input signal generated in a manner to be described.

The determination of parity is effected by counting the number of "1" bits transmitted during a page and thus establishing either a "1" or a "0" parity bit as required to produce an even number of "1" bits in the message, and which is included in the PCCW produced at the detection of the page mark of the succeeding page. Accordingly, the pulse train from inverter 178 and the transmitted serial data word from NAND gate 188 are supplied to NAND gate 190 and through inverter 191 to thereby alternately set and reset a parity flip-flop 192. The resultant output thereof is either a "1" indicating an odd number of 1" bits or "0" indicating an even number of "1" bits in the preceding page. That odd or even output is accordingly utilized for enabling the NAND gates 159 and 160 in the shift registers 150 and particularly a parity bit of "1" or "0" is added, as required, to make, or to maintain, respectively, an even number of "1" bits for the total transmission of the preceding page, including the parity bit of the following PCCW. The parity flip-flop 192 is reset by an output from a flip-flop shown in FIG. 6C to be described when the latter is set in response to the PAGE output in accordance with the clocking function of either a page or line signal as provided by the PGLN signal.

In FIG. 6C is shown the remainder of the processing circuitry for reading of the source data and the system controls for the reading and transmitting operations. Also in this portion is included the error detection circuitry. This circuitry is functional during the edit operation to detect errors in the data format and to detect an error resultant from uncertainty or unreliability of a mark or marks and to present the line containing that error information to the operator for human scrutiny.

Initially, there is considered the error checking function to assure that a page identification has been entered on either or both of the lines A and B of the page number. Absent an entry, the entire page of data related thereto would be lost since the page number serves to identify that data for addressing and processing functions at the central. Accordingly, there are provided a pair of associated page flip-flops PGFF1 labelled 210 and PGFF2 labelled 212. PGFF1 is set in response to PAGE producing an output PGFF to the set input of PGFF2. PGFF2 is accordingly set or reset in accordance with the state of PGFF1 upon the subsequent clocking function of PGLN. Note that PGFF is the output supplied to the parity flip-flop 192 in FIG. 6B. The reset outputs of PGFF1 and of PGFF2 are supplied to NAND gate 214 and the output thereof as well as PGLN are supplied to NAND gate 216. The latter also receives an input $\overline{MK}$ derived from the combined NAND gates 218 and 220 through inverter 222. Gates 218 and 220 produce MK as a result of anyone of the indicated inputs being false. From FIG. 6A, those inputs will be recognized as derived from the reset outputs of the first stage of the two-stage flip-flops and thus to indicate, when each is true, the absence of any detected mark in a given data line. Thus, if no mark is present, MK is false and if at least one is present, MK is true.

In operation, therefore, upon receipt of PAGE, PGFF1 is set. If prior to PGLN and thus for line A of the page number data, MK is true, $\overline{MK}$ is false and the output of NAND gate 216 remains up. If PGLN is received, PGFF2 is set in accordance with the setting of PGFF1 and the determination of MK being true or false then is based on line B of the page number data. Whereas in the reset states of PGFF1 and PGFF2, NAND gate 214 produces the logic "0" output, when either thereof is set, it produces a logic "1" output as a first enabling input to NAND gate 216. Thus, upon the subsequent PGLN signal following line B of the page number data, if MK is also true, NAND gate 216 is enabled and produces a logic "1" output.

To summarize, NAND gate 216 normally produces a logic "1" output but if after scanning of both lines A and B of the page number data, no mark is detected, its output drops to logic "0."

Inverter 224 normally produces logic "0" at the input to flip-flop 226 and thus the output of NAND gate 228 is normally logic "1" for PGMKD indicating that in the normal state a page mark has been provided. The logic "0" output of NAND gate 216 however produces a logic "1" through inverter 224, setting flip-flop 226 and enabling NAND gate 228 to produce the false or logic "0" output of PGMKD. That output is then supplied through inverter 230 as $\overline{PGMKD}$ to NAND gate 232. As will be explained, when $\overline{PGMKD}$ is true, the system terminates transport in the edit operation and backs the strip up for scrutiny of the page number lines.

A further error check is the presence of forbidden combinations of data bit mark indicia and particularly as shown in association with gates 240, 242, 244, and 246, respectively, various combinations of 2, 4, 8, 20, 40, and 80. In the BCD code adopted, no such combinations should exist for any data or page mark. Again, the inputs are derived from the correspondingly labelled outputs of the set terminals of the first stages of two bit shift registers in FIG. 6A. When any such combination is detected, an output is provided to the NAND gate 248 functioning as a logic OR with respect thereto and producing the output BDMK. That output designates a bad mark and, as thus far explained, one resulting from a data format error.

A further error detection is afforded in accordance with questionable integrity of the mark indicia. More particularly, the questionable mark threshold detection circuit 250 establishes, for the edit operation, two threshold levels somewhat above and below a single threshold of detection utilized in the transmit operation. The zone between these two levels is the questionable zone or the zone in which output levels derived in detecting a mark are considered unreliable. More particularly, output levels below the lower threshold are accepted as background noise and the like, whereas output levels exceeding the upper threshold are considered to provide reliable signal indications of actual detected marks. In the intermediate band, the levels may result from various effects such as too light a mark or a poor erasure of a previous mark or even displacement of a mark sufficiently as to produce a questionable output level in scanning thereof. When any such mark is detected, as may be accomplished by conventional threshold level detection circuits, the circuit 250 produces an output to the NAND gate 248 which is effectively OR'd with the data format error circuitry outputs to also produce a BDMK output.

Conveniently, the external system controls provide the logic inputs to NAND gate 252 receiving BDMK and NAND gate 232 receiving PGMKD to identify the edit operation in which these error checking functions are effective and to eliminate those functions during transmit. The LINE input to gate 252 assures during edit that the entire line has been sensed before the error checking function is operable.

Considering the system controls, momentary forward and reverse switches 260 and 262 provide for setting and resetting, respectively, flip-flop 264 and, through power circuits 266 and 268, energizing of forward drive solenoid 270 and reverse drive solenoid 272, respectively. Respectively associated indicator lamps 271 and 273 are provided for the forward and reverse drives. In either condition, holding relay 274 is energized to close and hold closed its contacts 276 and maintain the forward and/or reverse drive conditions through energization of the corresponding solenoids. The micro-switch 278 corresponding to switch 42 in FIG. 2 is also shown and is operative through its circuit connection to terminate either of the forward or reverse drive conditions when the switch is opened as the trailing edge of a strip passes thereover. The forward control, through flip-flop 264, produces FWD to gates 232 and 252 for enabling the latter in the edit operation.

A transmit switch 280 of a toggle type is also provided, as indicated in FIGS. 1 and 2, and having an associated indicator lamp 282, which produces the $\overline{XMT}$ input to each of gates 232 and 252 to disable the latter during the transmit operation from performing the error checking functions. The closure of transmit switch 280 operates through inverter 284 to enable the data modem 200 in accordance with the transmit control applied thereto as shown in FIG. 6B. Finally, a stop switch 286 is provided for use in emergency situations; typically it is not desired to stop during transmit operations although it is acceptable and may be desirable during edit. Actuation of that switch opens the energizing circuit for relay 274.

When any of the error checking functions indicate that an error exists, either as to reliability of data marks or to errors in data format including forbidden combinations and missing data, the system automatically terminates the transport in edit and reverses the strip for positioning at the position containing the error. Accordingly, one shot 290 responds to an output from either of gates 232 or 252 identifying such an error, disabling power control circuit 292 and thus terminating the forward drive energization. A further output from one shot 290 is applied to a second one shot 294, the output of which is gated through gate 296 to thereby energize the reverse drive solenoid 272 for a period of time determined by the one shot 294. That energization affords a drive of duration sufficient to position the strip at the error indication position as illustrated in FIG. 3. The time duration of the output of one shot 294 particularly is selected in accordance with knowledge of the speeds of motion of the various elements of the system and the required time duration of actuation. Particularly, since these factors remain fixed, it is a simple matter to determine experimentally the necessary drive time for reversing the strip upon termination of the transport thereof following detection of an error and repositioning that erroneous data line at the error indication station.

In summary, as to the reader and transmitter, during the edit operations the various strips are assembled and compiled into a continuous strip and noted error checks performed. In transmit, therefore, the document is read continuously and the data converted from parallel to serial form and the serial digital words further processed through a modem to produce an analog signal suitable for transmission over conventional telephone lines. Prior to discussion of the receiver, certain additional control functions related to the transmission are first considered.

As is conventional in communication equipment of this type, each transmission, which may be considered a message, is preceded by a start of message signal and ended by an end of message signal. For this purpose, an additional page of the fan-fold strip is provided at the beginning and at the end of the compiled pages containing the data to be transmitted. The starting page conveniently is utilized to encode a start of message signal and particularly this is encoded by appropriate marking of that sheet in the lines A and B of the page number section. Those same lines are used in the last page for encoding an end of message indication. The page mark of that last page then also provides for the generation of the PCCW signal relating to the last page of data.

A specific, illustrative encoding for the start and end of message signals is set forth in relation to the receiver discussion which follows. Generally, it will be recalled that certain combinations of data indicia were not accepted by the logic as proper data or as properly formatted for data. These combinations are particularly convenient to use as the start and end of message signals. It further will be appreciated that those combinations were not required for encoding of the data in any event. In the edit operation, those encoding indicia utilized for indicating the start and end of message would be detected by the error checking circuit. The operator, however, would immediately recognize the reason for the error indication which would result and merely effect an override of the error control to permit the strip to be processed for error checking of the data as above described.

Figure 7B:
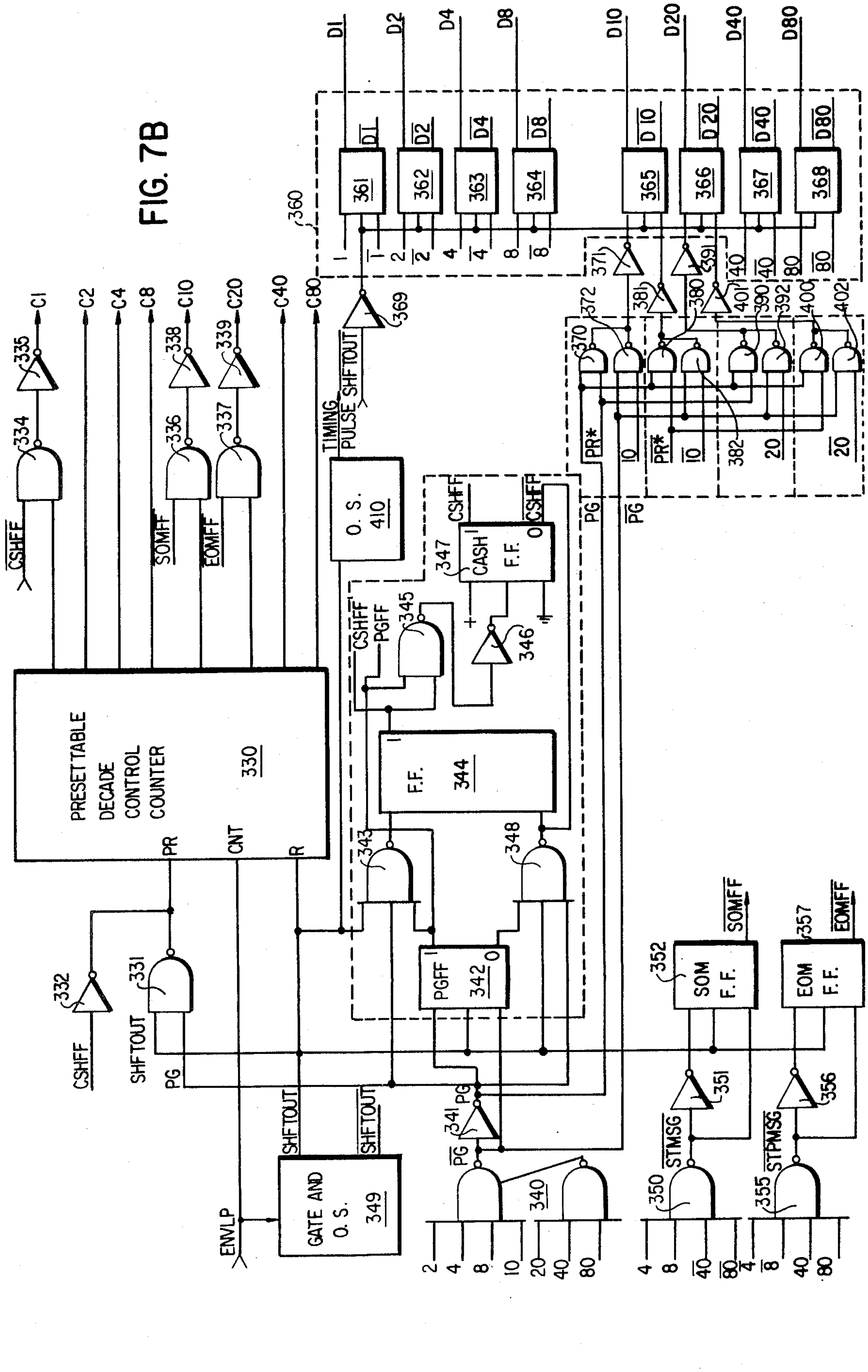

Referring now to FIGS. 7A through 7D, FIGS. 7A and 7B comprise the logic diagram of the receiver, FIG. 7C comprises a table of illustrative binary coded output format produced by the receiver in response to received messages and FIG. 7D comprises a timing chart of certain significant timing functions occurring within the receiver. The significance of the PCCW will be more fully appreciated in the response of the receiver to the message. As will be recalled, that word signifies each new page of data and permits the receiver to identify the specific page number and, in relation thereto in the order mode, a line identification. By this technique, the receiver, in accepting the bit serial data stream from a receiving modem, converts the accepted signal into meaningful information. In the presently disclosed system, that may constitute ordering information supplied as an input to a computer system for a chain store. The 8-bit serial word of data contained within the 10 bits including start and stop bits, is received and converted into a 16-bit serial word consisting of an 8 bit line number and an 8-bit quantity number. In effect, as hereinafter described, the receiver in the data transmission system generates a 400 character per second output rate in response to the received data. That data nevertheless is received over ordinary voice grade telephone lines, which typically cannot effect reliable voice band data transmission at that high a character rate. Generally, reliable use of a dial network with such telephone lines and by conventional frequency modulation schemes is limited to a maximum transmission rate of 1,200 bits per second. The disclosed system is thus shown for operation at that 1,200 bits per second rate.

The significance of the 400 character per second output rate generated by the receiver in the present system is more fully appreciated by contrast to conventional transmission systems. For example, at the 1,200 bits per second rate, the maximum character rate is normally 200 characters per second or less. Whereas a straight BCD numeric would be transmitted at 200 characters per second, transmission in the ASCII code would be at a maximum of only 120 characters per second.

Referring now to FIG. 7A, a modem 300 receives the analog signal and produces a serial digital pulse train processed through a detector 302 and supplied to an amplifier 304 and a serial to parallel converter 306. The envelope one shot 308 responds to the start bit, a logic "1," of each digital word, and produces a 7.08 millisecond output pulse. The 1,200 BPS oscillator 310 responds to that envelope pulse to generate eight precisely timed shift pulses during that envelope. The envelope and the shift pulses are identified in the waveforms of FIG. 7D, as well as the data in pulse train including 8 data bits plus the start and stop bits. As before noted, the start bit is always logic "1" and the stop bit, always logic "0." The shift pulses are also applied to the converter 306 and gate the 8 data bits into eight corresponding bit storage stages. When the 8-bit word is completely gated in, therefore, the outputs are available in parallel form from the respective stages as indicated by the outputs 1, $\overline{\mathbf{1}}$,...80, $\overline{\mathbf{80}}$.

The parity check function is performed by supplying the received data bits to one input of NAND gate 312 which also receives the 8 shift pulses and is enabled upon coincidence thereof with logic "1" data bits, to supply an output through inverter 314 for triggering the parity flip-flop 316. Since in transmission, a parity bit of logic "1" or logic "0" is added to make an even number of "1" bits, the output of the parity flip-flop 316 will always be "1" if the parity is correct. The parity flip-flop 316 is reset following each page of data, by an output from NAND gate 318 functioning as a logic OR to inputs PGFF and CSHFF'. These are generated, as later described, upon recognition of the receipt in the receiver of one PCCW in the case of the order mode or of two PCCW signals in the case of a cash mode of transmission.

Referring now to FIG. 7B, the presettable decade control counter 330 generally performs the function of generating an 8-bit control word of the bits C1, C2,...C80 which thus identifies to a computer the nature or significance of an associated 8-bit data word simultaneously produced with the control word. The output format of the control words and associated data words is shown in FIG. 7C. As discussed in more detail below, receipt of a PCCW presets the counter 330 to the parity check format and associated therewith, there is generated the illustrated 8-bit data word containing the transmitted parity bit $P_R$ as the least significant data bit and two parity check data bits $P_{CK}$ in the D10 and D20 data bit positions as a function of the outputs of parity flip-flop 316.

If a second PCCW is received, identifying the cash mode, the counter is locked to the control word illustrated in the cash line. In that case, the page A and page B words, when received, provide corresponding data words which may be utilized for identification or any other purpose as desired, but the counter remains locked in the format indicated for those page numbers as well as for the ensuing data words. Accordingly, the effective rate of transmission is reduced to 200 characters per second in the cash mode. In this mode, of course, the system has general applicability for gathering data and effecting efficient and still high speed transmission of that data to a central station for further processing in accordance with any conventional coding scheme desired.

Returning again to the parity check line, the count therein illustrated, to which counter 330 is preset, corresponds to three counts less than a maximum count of 8 "1's." The counter is advanced by one count to produce the page A control word and the data bits processed for recognition by the computer of that page number. The next 8-bit word received advances the counter 330 one more count to the full count of 8 "1" bits identifying the page B control word and the associated data bits are processed again by the computer as identifying the page number. By this technique, therefore, the computer automatically identifies the receipt of page number words and the value of the page number for addressing functions.

The counter now advances to all "0's" corresponding to the first data line 00 and, as illustrated in the output format, a representative quantity order of 01 is provided by the data bits. The counter advances for each subsequent 8-bit word through to line 49 (or whatever maximum line is provided) and for which an illustrative quantity order of 99 is illustrated.

The start of message and end of message control and data word bits are also illustrated. It will be appreciated that these are encoded in accordance with the forbidden data bit format as above described.

Considering FIG. 7B in detail, therefore, the output of the envelope detector 308, ENVLP, is supplied to the counter 330 to effect its advance for each 8-bit data word received. The first word received, if any message, is PCCW and it will be recalled that this was transmitted as all logic "1's" for every bit position except the "1" position utilized for the parity bit. Logic gate 340 decodes that word to produce $\overline{PG}$ and, through inverter 341, PG when PCCW is received. Gate 349 responds to ENVLP and on the trailing edge thereof the one shot of circuit 349 produces a shift out pulse labelled SHFTOUT and which is shown in FIG. 7D. When PG identifying receipt of PCCW, and the related SHFTOUT pulse are coincident, NAND gate 331 is enabled to present counter 330 as described to the parity check control word.

PG is also applied to a flip-flop 342, labelled PGFF, setting the latter and producing the output PGFF. PGFF remains set and, if a subsequent PCCW is received, PG is again generated and upon receipt of the related SHFTOUT from the gate and one shot 349, NAND gate 343 is enabled, setting flip-flop 344. NAND gate 345 is now enabled and, through inverter 346, sets the flip-flop 347 labelled CASHFF producing the indicated outputs and thereby identifying cash mode of operation. Reset of flip-flop 344 is provided from NAND gate 348 responsive to PG and SHFTOUT and the reset output of PGFF 342. Returning again to the input gating to counter 330, recognition of the cash mode thus produces CSHFF through inverter 332 to the preset input of counter 330. In this instance, however, the complement $\overline{CSHFF}$ disables NAND gate 334 and, through inverter 335, produces a "0" value for the C1 bit as indicated in FIG. 7C for the cash control word format. Since only C1 is controlled, it will be appreciated that the cash and parity check control words differ by the value of the C1 bit, the C2 bit having been preset to zero in either case.

Preceding the message, as noted, is a start of message signal here illustrated to be encoded by data bits 4 and 8 having a "1" value and bits 40 and 80 having a "0" value and, correspondingly, $\overline{\mathbf{40}}$ and $\overline{\mathbf{80}}$ being logic "1" in accordance with the inputs to gate 350. The output $\overline{STMSG}$ identifies the start of message and is applied through inverter 351 to set the SOM flip-flop 352 thereby producing $\overline{SOMFF}$ as an output.

In a substantially similar manner, the end of message flip-flop 355 responds to the complementary, corresponding inputs at the start of message gate 350 to produce $\overline{STPMSG}$. That signal supplied through inverter 356 sets the end of message flip-flop 357, the latter producing $\overline{EOMFF}$ as an output. Referring again to the outputs of the control counter 330, $\overline{SOMFF}$ and $\overline{EOMFF}$ are supplied as inputs to NAND gates 336 and 337 and, through inverters 338 and 339, respectively, cause the C10 and C20 positions of the control word to have the values "0" and "1" for the start of message and "1" and "0" for the end of message. The control "1's" bits advance as in the case of the page A and page B control words. The data bit positions for the start and end of message signals conveniently are made "0's" and "1's" as shown for encoding of the beginning and ending strips.

Finally, there is considered the output gating of the data bits. Output register 360 includes eight storage elements, which may comprise flip-flops, corresponding to the eight data bits and receiving as inputs the eight parallel data bits from the converter 306. These are entered into the registers simultaneously upon receipt of $\overline{\text{SHFTOUT}}$ through inverter 369. This assures that the bits are all properly entered in the converter 306 prior to being applied to the stages of the output register 360.

In the case of the data word bits generated in response to receipt of PCCW, however, additional gating control is provided, particularly for inserting the parity check control bits. Initially, it will be appreciated that the D1 buffer stage will be set appropriately to the transmitted parity bit $P_R$ from the converter 306.

The parity bit generated by the receiver then is inserted in the D10 and D20 positions, selected arbitrarily. Particularly, the $P_R^*$ and $\overline{P}_R^*$ are applied to NAND gates 370 and 380, respectively, the latter also receiving PG to be enabled thereby and, through associated inverters 371 and 381 correspondingly set or reset the buffer stage 365 to correspondingly produce the parity bit $P_{CK}$ as a parity check bit in the D10 bit position. When $\overline{\text{PG}}$ is true, the 10-bit position from the converter 306 is gated through NAND gate 372 and similarly the $\overline{\mathbf{10}}$ position is gated through gate 382, and the respectively associated inverters 371 and 381, to set the stage 365 in accordance with the data bit. Gates 390, 392, and 400, 402 with the associated inverters 391 and 401, effect corresponding setting of stage 366 for the D20 position, as described for the D10 position.

The bit information stored in the output buffer 360 is thus maintained until a subsequent data word is entered from the converter, in association with the gating system as described for the parity bits. In response to each SHFTOUT pulse, a timing circuit shown as one shot 410 produces a timing pulse as illustrated in FIG. 7D. That timing pulse conveniently is utilized by the computer to respond to the 16 bits of the 8-bit control word and the eight bit data word to receive that information for further processing.

It will be apparent to those skilled in the art that numerous modifications and adaptations to the system of the invention may be made and thus it is intended by the appended claims to cover all such modifications and adaptations as fall within the true spirit and scope of the invention.

What is claimed is:

1. A source data input device for reading data from an elongated strip on which the data is represented by indicia selectively applied to the strip in accordance with a plurality of rows of indicia receiving areas, comprising:

a sensing station including means for scanning the rows of indicia receiving areas of a strip and producing output signals in accordance with scanning of indicia therein, the output signals being proportional in signal level to the integrity of the scanned indicia, means for transporting the elongated data strip through the scanning station, error checking means establishing threshold levels and including comparison means responsive to the threshold levels and responsive to the output signals from said scanning station for producing an error indication output for each output signal having a signal level relative to the threshold levels corresponding to indicia or doubtful integrity, and control means responsive to an error indication output from said error checking means to control said transport means to stop the transport of the strip for human scrutiny of the scanned indicia receiving areas resulting in the error checking output signal.

2. A device as recited in claim 1 wherein said error checking means further comprises:

means for establishing first and second threshold levels, and said comparison means compares the signal levels produced by said scanning station with said thresholds thereby to recognize signals less than said first threshold as not representing scanned indicia and to accept signals exceeding said second threshold as representing indicia of acceptable integrity, while recognizing any signal of a level intermediate said first and second thresholds as representing scanned indicia of doubtful integrity.

3. A device as recited in claim 1 wherein there are defined prohibited data bit formats of the data indicia and said error checking means comprising:

means for processing the output signals from said scanning station and representing the scanned data indicia, to determine if that indicia conforms to the prohibited data bit formats.

4. A device as recited in claim 1 wherein the elongated strip comprises a fan-fold strip and wherein said transport means further comprises:

means for receiving a supply of said fan-fold strip in a folded stack for transport therefrom through said sensing station, and means for receiving the strip subsequent to transport thereof through said scanning station for scanning in a random stack.

5. A device as recited in claim 1 wherein said transport means further includes:

a splicing station, means for sensing the trailing edge of the fan-fold strip, and means for controlling said transport means to terminate transport of the strip with the trailing edge thereof positioned at the splicing station.

6. A source data input device for reading data from an elongated strip wherein said strip comprises a plurality of successive pages connected end to end and wherein each page includes a plurality of rows of indicia receiving areas, at least one row of indicia receiving areas on each such page having indicia selectively applied thereto to identify the number of that page, comprising:

a sensing station including means for scanning the rows of indicia receiving areas of a strip and producing output signals in accordance with scanning of indicia therein, means for transporting the elongated data strip through the scanning station, means for recognizing the scanning of the page number row for each such page, error checking means receiving the output signals from said scanning station and responsive to the absence of indicia in said page number row during scanning thereof in response to said recognizing means to identify an error in the data format of that row and produce an error indication output in response thereto, and control means responsive to an error indication output from said error checking means to control said transport means to stop the transport of the strip for human scrutiny of the page number row containing the data format error.

7. For use in a source data input system, a data bearing document adaptable for high speed transport past a scanning station comprising:

a plurality of pages adapted for being joined at the trailing end of each thereof to the leading end of a successive one thereof, to afford a continuous elongated document, the elongated document being foldable at the joined ends of the pages for superpositioning of the pages in a stack, each such page including a plurality of columns of preprinted marks and of mark indication areas for scanning by respectively corresponding scanning means and including:

a column containing a preprinted page mark, a plurality of columns of mark indication areas with the indication areas grouped in transverse rows for receiving indicia selectively therein in accordance with a prescribed data format, a column of timing marks with the timing marks respectively corresponding to, and in predetermined positions with respect to, the corresponding rows of indication areas for scanning by the respectively corresponding scanning means in timed relationship to the scanning of the indication areas of the respectively corresponding rows, and a column containing a blanking mark extending from each of the leading and the trailing ends of each such page and defining corresponding end areas extending transversely thereof and devoid of mark indication areas, for being sensed by associated scanning means to inhibit responses to scanning of any marks in the transverse end areas of each such page.

8. A data bearing document as recited in claim 7 further comprising:

a predetermined number of said rows of indication areas on each such page, identifiable in accordance with the row relationship thereof to said page mark, being utilized for receiving indicia for identification of the number of each such page.

9. A document as recited in claim 8 further comprising:

each successive row of said indication areas subsequent to said predetermined number thereof being identifiable by its row position relative to said page mark and said predetermined number of page identification rows.

10. A document as recited in claim 9 wherein there is further provided a second timing mark adjacent said first thereof and preceding a first of said rows of indication areas thereby to distinguish between the subsequent data processing to be performed on the data derived in scanning of said rows of areas for each such page.

11. A source data input device for reading data from an elongated strip on which the data is represented by indicia selectively applied to the strip in accordance with a plurality of rows of indicia receiving areas, comprising:

a support for said strip over which said strip is transported and including a first generally flat portion and a second arcuate portion, transport means for transporting said strip over said support and across said first and second portions thereof in succession and including means for tensioning said strip in passing over said second, arcuate portion, and means for scanning said strip, said scanning means being positioned to scan said strip at an intermediate position of said arcuate portion of said support means as said strip is transported thereover.

12. A device as recited in claim 11 wherein there are further provided edge guides associated with said support means to confine lateral movement of said strip.

13. A device as recited in claim 11 wherein said transport means includes drive means for drawing said strip from said support means, said drive means being positioned adjacent the end of said second, arcuate portion remote from said first, flat portion, and said tensioning means is associated with said flat portion and applies a dragging force to said strip opposing the direction of transport of said strip effected by said drive means to cause said strip to conform to said arcuate portion of said support means.

14. A method for gathering source data from each of a plurality of remote locations for use at a central location and employing a fan-fold strip having a plurality of pages connected end to end and utilized in association with respectively corresponding plural pages of a computer print out, each page of said computer print out being identified and including a plurality of rows of items and each page of said fan-fold strip including means for indicating each successive such page thereof and having a plurality of rows of indication areas for receiving indicia in accordance with predetermined data format identifying the corresponding page of said computer print out with which it is utilized and for entering data indicia in relation to the items of the corresponding rows of the corresponding computer print out page, comprising:

positioning a fan-fold strip in association with a plural page computer print out for associating each page of the strip with each page of the print out and aligning each row of the strip with each row of the print out page, marking each page of said strip in the page identifying indication areas to identify that page in relation to the associated computer print out page, entering data indicia on said page of said strip in said rows of indication areas in relation to the items in the corresponding rows of the associated page of the computer print out, scanning the pages of said fan-fold strip in succession and the rows of areas of each thereof in sequence to generate at least one digital word indicating each successive page and at least a further digital word specifically identifying that page in accordance with the page indicia entered thereon, and to generate a sequence of digital words corresponding to the plural rows of indication areas of each said page and corresponding to the data represented by the indicia therein, processing the digital words as electrical signals for transmission from a remote location to a central location, receiving at said central location the transmissions from each of a plurality of remote locations in accordance with the identification of the remote location, and recognizing, at the central location, for each transmission received thereby, the digital word identifying each new page, in succession, for generating a respectively corresponding digital control word and generating a succession of identifying digital control words in accordance with receipt of the succession of page identification and data digital words, for thereby identifying each such digital word.

15. A method as recited in claim 14 wherein each page of the fan-fold strip is indicated by an initial preprinted mark thereon and identification of each page in scanning thereof is performed by automatically generating the said at least one digital word identifying each new page in response to detection of that mark.

16. A method as recited in claim 14 wherein there are provided two said page marks and wherein a page identifying digital word is generated for each of said page marks, further comprising recognizing in each transmission the receipt of two successive page identification marks for generating a digital control word of fixed format in association with receipt of the succeeding data words.

17. A transmitter for use in a data transmission system for transmitting a message of plural, successive digital words ordered in groups thereof in accordance with their derivation from corresponding pages of a data source document of plural pages, for transmission to a remote location, comprising:

means responsive to an output derived in scanning said source document in accordance with each successive page thereof to generate an initial digital word of predetermined format indicating the initiation of a group of successive digital words, means responsive to data derived from said document in accordance with encoded data indicia provided thereon in successive groups of data indicia receiving areas on each said document to generate a corresponding succession of digital words, and means responsive to each such digital word thus generated to produce a serial bit digital word for transmission to a central location, in succession, for the plurality of successive digital words.

18. A transmitter as recited in claim 17 wherein each page of the document includes a timing mark preprinted thereon, and wherein:

said generating means includes means responsive to scanning of said timing mark for automatically generating said initial digital word in said predetermined format.

19. A transmitter as recited in claim 17 wherein said means for generating each digital word as a serial word for transmission comprises:

means responsive to reading of the indicia in each group of associated areas to initiate a timing cycle at a prescribed frequency rate and of a number of bit time positions corresponding to the number of bits in the digital word to be generated, and gating means responsive to each bit of each digital word and to said timing cycle for supplying the plural bits of each digital word in succession in predetermined time positions as the output serial digital word for transmission.

20. A transmitter as recited in claim 19 wherein there is further provided means enabled by said bit position timing means and by the bits of each digital word in each group thereof to determine the parity of the digital words derived in reading data indicia from each page.

21. A transmitter as recited in claim 20 wherein there is further provided means responsive to the parity value of each group of digital words to produce a parity bit of a required bit value in accordance with the adopted parity convention and for inserting that parity bit in a predetermined bit position of the succeeding, initial digital word of predetermined format.

22. A transmitter as recited in claim 17 wherein there is further provided error checking means responsive to scanning of data indicia of prohibited format in each such digital word to terminate the reading operation of said device.

23. A transmitter as recited in claim 22 wherein said error checking means is responsive to the absence of any indicia where such indicia is required for a given digital word to indicate an error to terminate the reading operation of said device.

24. A transmitter as recited in claim 23 wherein there are provided means for effecting said error checking functions in an edit operation of said device and where said error checking functions are inhibited during a transmit operation of said device.

25. A receiver for use in a data transmission system wherein received data comprises a message of a plurality of digital words received in succession and ordered in groups thereof as indicated by at least an initial digital word of predetermined format, comprising:

decoding means responsive to receipt of said initial digital word of said predetermined format to recognize the initiation of receipt of one such group of successive digital words, output means responsive to receipt of each digital word for producing a plural bit data word output, control word generating means initialized by said decoding means in response to receipt of said digital words of said predetermined format for generating a plural bit digit control word output to be supplied simultaneously with said data word output, and means responsive to each successive digital word of each group thereof in each said message to supply a word receipt signal to said control word generating means, and means for enabling said control word generating means to respond to each said word receipt signal corresponding to each newly received digital word to generate a respectively corresponding control word in accordance with the relationship of that new digital word to said initial digital word.

26. A receiver as recited in claim 25 wherein said enabling means further includes means associated with said decoding means and responsive to receipt thereby of two successive ones of said initial digital words of said predetermined format to produce an inhibit output, and said enabling means is disabled upon receipt of said inhibit output to prevent said control word generating means from receiving any further ones of said word receipt signals and thereby to maintain the control word output of said control word generating means in the initialized format thereof throughout succeeding digital words of each said group of a message.

27. A receiver as recited in claim 26 wherein there is further provided gating means associated with at least one bit position of the plural bit output of said control word generating means to alter the value of that bit position in response to said inhibit signal.

28. A receiver as recited in claim 25 wherein the data transmission is in serial form and there is further provided:

means responsive to a start bit of each received serial digital word to generate a time duration signal of prescribed duration, means responsive to and enabled by said time duration signal to generate a plurality of shift pulses at a rate in accordance with a predetermined bit rate of the transmission, and a serial to parallel converter having a number of stages corresponding to the number of data bits in each digital word for receiving the serial digital word for storage therein in the corresponding stages thereof under control of said shift pulses to supply said digital word bits to said output data word means.

29. A receiver as recited in claim 28 wherein there is further provided means enabled by said shift pulse train and responsive to the serial data bits of each received word for the entirety of words of each group to determine the parity thereof.

30. A receiver as recited in claim 29 wherein the initial digital word includes in the predetermined format thereof a parity bit position containing a parity bit relating to the preceding group of digital words and wherein:

said data word output means provides said parity bit derived from said initial digital word, as received, as that corresponding bit in the output data word, and there is further provided gating means responsive to the parity output indication of said parity determining means of said receiver for inserting a parity bit in a predetermined bit position of the data word output produced in response to receipt of each said initial digital word.

31. A receiver as recited in claim 25 wherein start of message and end of message indications are provided by bit encoded digital words of a format prohibited for use in any other digital words of the transmission, and there is further provided:

start of message and end of message decoding means responsive to receipt of start of message and end of message digital words in the corresponding predetermined formats for enabling said receiver to recognize the start and end of messages, respectively.

32. In a system for transmitting and receiving data derived from a source data document comprising a fan-fold strip having a plurality of pages connected end-to-end and utilized in association with respectively corresponding plural pages of a computer print out, each page of said computer print out being identified and including a plurality of rows of items and each page of said fan-fold strip including means for indicating each successive such page thereof and having a plurality of rows of indication areas for receiving indicia in accordance with predetermined data format identifying the corresponding page of said computer print out with which it is utilized and for entering data indicia in relation to the items of the corresponding rows of the corresponding computer print out page, a transmitter for transmitting a message of plural, successive digital words ordered in groups thereof in accordance with their derivation from corresponding pages of the data source document of plural pages, comprising:

means responsive to an output derived in scanning said source document in accordance with each successive page thereof to generate an initial digital word of predetermined format indicating the initiation of a group of successive digital words, means responsive to data derived from said document in accordance with encoded data indicia provided thereon in successive groups of data indicia receiving areas on each said document to generate a corresponding succession of digital words, and means responsive to each such digital word thus generated to produce a serial bit digital word for transmission to a central location, in succession, for the plurality of successive digital words; and a receiver for receiving, decoding, and responding to the transmitted data received from said transmitter, comprising:

decoding means responsive to receipt of said initial digital word of said predetermined format to recognize the initiation of receipt of one such group of successive digital words, output means responsive to receipt of each digital word for producing a plural bit data word output, control word generating means initialized by said decoding means in response to receipt of said digital word of said predetermined format for generating a plural bit digital control word output to be supplied simultaneously with said data word output, and means responsive to each successive digital word of each group thereof in each said message to supply a word receipt signal to said control word generating means, and means for enabling said control word generating means to respond to each said word receipt signal corresponding to each newly received digital word to generate a respectively corresponding control word in accordance with the relationship of that new digital word to said initial digital word.

* * * * *